United States Patent [19]

Hughes et al.

[11] Patent Number: 5,164,871
[45] Date of Patent: Nov. 17, 1992

[54] SHUTTERS WITH INTEGRALLY MOLDED SPRING ELEMENTS FOR FLEXIBLE MAGNETIC DISC CASSETTES

[75] Inventors: Patrick M. Hughes, Clinton, N.J.; Maribeth Fletcher, Lisle, Ill.

[73] Assignee: Hoechst Celanese Corporation, Somerville, N.J.

[21] Appl. No.: 650,851

[22] Filed: Feb. 5, 1991

[51] Int. Cl.$^5$ ........................................... G11B 23/033
[52] U.S. Cl. .................................................... 360/133
[58] Field of Search ........................ 360/133; 369/291

[56] References Cited

U.S. PATENT DOCUMENTS

| | | | |
|---|---|---|---|
| Re. 32,781 | 11/1988 | Takahashi | 360/133 |
| 3,845,502 | 10/1974 | Paus | 360/86 |
| 4,078,246 | 3/1978 | Berthoux et al. | 360/133 |
| 4,436,201 | 3/1984 | Inaba | 206/444 |
| 4,445,155 | 4/1984 | Takahashi | 360/99 |
| 4,481,552 | 11/1984 | Dona et al. | 360/97 |
| 4,517,617 | 5/1985 | Tsuji et al. | 360/133 |
| 4,590,532 | 5/1986 | Saito | 360/133 |
| 4,613,044 | 9/1986 | Saito et al. | 206/444 |
| 4,628,388 | 12/1986 | Kawabe | 360/128 |
| 4,630,156 | 12/1986 | Saito | 360/133 |
| 4,669,078 | 5/1987 | Ogusu | 369/291 |
| 4,686,666 | 8/1987 | Dieffenbach | 369/290 |
| 4,698,714 | 10/1987 | Sugawara et al. | 360/133 |
| 4,710,913 | 12/1987 | Matsushima et al. | 369/280 |
| 4,796,140 | 1/1989 | Wakabayashi et al. | 360/133 |
| 4,885,653 | 12/1989 | Kato | 360/133 |
| 4,903,224 | 2/1990 | Namiki et al. | 369/290 |
| 4,926,410 | 5/1990 | Suzuki et al. | 369/290 |
| 4,941,066 | 7/1990 | Swinburne et al. | 360/133 |
| 4,944,982 | 7/1990 | Kikuchi | 428/64 |
| 4,945,530 | 7/1990 | Sandell et al. | 369/291 |

FOREIGN PATENT DOCUMENTS 3729241  3/1989  Fed. Rep. of Germany ...... 360/133

Primary Examiner—Robert S. Tupper
Attorney, Agent, or Firm—Nixon & Vanderhye

[57] ABSTRACT

A flexible magnetic disc cassette includes a cassette case formed of a molded plastics material defining an interior space and a window which opens thereinto. A flexible magnetic disc having a central hub is rotatably accommodated with the interior space of the cassette case such that the magnetic disc is exposed beneath said cassette case window. A shutter formed of a plastics material (which may be the same or different than the plastics material form which said cassette case is formed) straddles an edge of the cassette case adjacent to its defined window. The shutter is reciprocally movable along the edge between a closed position (wherein said shutter covers the window) and an opened position (wherein the shutter exposes the window to allow access to said magnetic disc thereunder). According to the invention disclosed herein, an elongate spring element is integrally molded (unitary) with either the cassette case or the shutter and so as to occupy a position within a corner pocket of the cassette case. The integral spring exerts a bias force against the shutter in a direction which encourages the shutter to move into its closed position.

17 Claims, 4 Drawing Sheets

SHUTTERS WITH INTEGRALLY MOLDED SPRING ELEMENTS FOR FLEXIBLE MAGNETIC DISC CASSETTES

FIELD OF INVENTION

The present invention relates generally to cassettes for flexible sheet-like discs of magnetic media. More specifically, the present invention relates to improved cassette constructions for flexible magnetic discs whereby a shutter is provided with an integrally molded spring element.

BACKGROUND AND SUMMARY OF THE INVENTION

Flexible sheet-like magnetic discs having a nominal standardized size of about 3.5 inches are widely used in a variety of data storage/retrieval systems. For example, cassettes which include flexible magnetic discs are used in conjunction with personal computers so as to load data and/or programs into the central processing unit of the computer, as well as to store data in an off-site location in a more convenient manner.

When placed into service in a magnetic recording/reproducing apparatus, the magnetic disc (which is accommodated for rotational movement within the interior of the cassette case) is caused to spin relative to a magnetic read/write head by means of a motor-driven spindle coacting with an aperture in the central hub of the magnetic disc. The spindle, moreover, serves to center the magnetic disc relative to the magnetic read/write head so that accurate placement and retrieval of data onto and from the disc will ensue.

The cassette case for the magnetic disc is typically formed with radially elongate (relative to the magnetic disc) access windows—usually on opposing sides of the cassette case so that data magnetically stored on each side of the magnetic disc can be accessed by respective read/write heads associated with the magnetic recording/reproducing apparatus. Protection against inadvertent scratching of the magnetic disc surface and/or accumulation of dust is afforded by means of a relatively thin inverted U-shaped shutter mechanism that is movable along the edge of the cassette case adjacent to the access windows. Thus, the shutter opens and closes the access windows when the disc is placed in service within and removed from, respectively, the magnetic recording/reproducing apparatus. Movement between these opened and closed positions is facilitated by means of a separate spring element (typically formed of a small gauge, but relatively stiff, wire) which exerts a bias force in a direction tending to move the shutter into its closed position.

As can be appreciated, during assembly of flexible magnetic disc cassettes, the separate handling of the spring element necessarily translates into additional labor during cassette manufacturing—hence, increased production costs. Furthermore, handling of the spring element itself is quite tedious due to its relatively small size thereby leading to increased possibility of incorrect positioning of the spring element during assembly of the magnetic disc cassette. Incorrectly positioned spring elements could, in turn, lead to improper performance of the shutter mechanism during use. Accordingly, when incorrectly positioned spring elements are detected during the manufacturing process, the entire cassette is usually rejected—again leading to increased production costs.

According to the present invention, however, shutter elements formed of a plastics material are provided with an integrally molded (unitary) spring element. Thus, separate handling and/or manipulation of the shutter and spring element during assembly of the magnetic disc element is avoided. As a result, the cassettes may be assembled with greater speed and accuracy as compared to conventional cassettes which employ structurally separate shutter mechanisms and spring elements.

The shutter according to the present invention is a relatively thin (e.g., a thickness of between about 0.012" to 0.022", preferably 0.015") inverted U-shaped structure having a base and a pair of depending walls which, like conventional shutters, straddle an upper edge region of the cassette case adjacent to the magnetic disc access windows. The base thus reciprocally moves along the cassette edge so that the depending walls likewise move parallel to respective surfaces of the cassette so that windows defined in the walls are capable of registry with respective ones of the access openings when the shutter is in its opened condition.

An elongate spring element is integrally molded to (i.e., one-piece structure with) the base of the shutter. Most preferably, the integrally molded spring element extends longitudinally outwardly from the base of the shutter and terminates in a free end that coacts with a stop molded into the interior of the cassette. The stop thus serves to positionally fix the free end so that when the shutter is moved in a direction towards the stop, the resiliency of the spring element will translate into a bias force being exerted upon the shutter in an opposite direction. The spring element could, however, be integrally molded into the cassette itself, in which case the stop is associated with the shutter.

Further aspects and advantages of this invention will become more clear after careful consideration is given to the detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
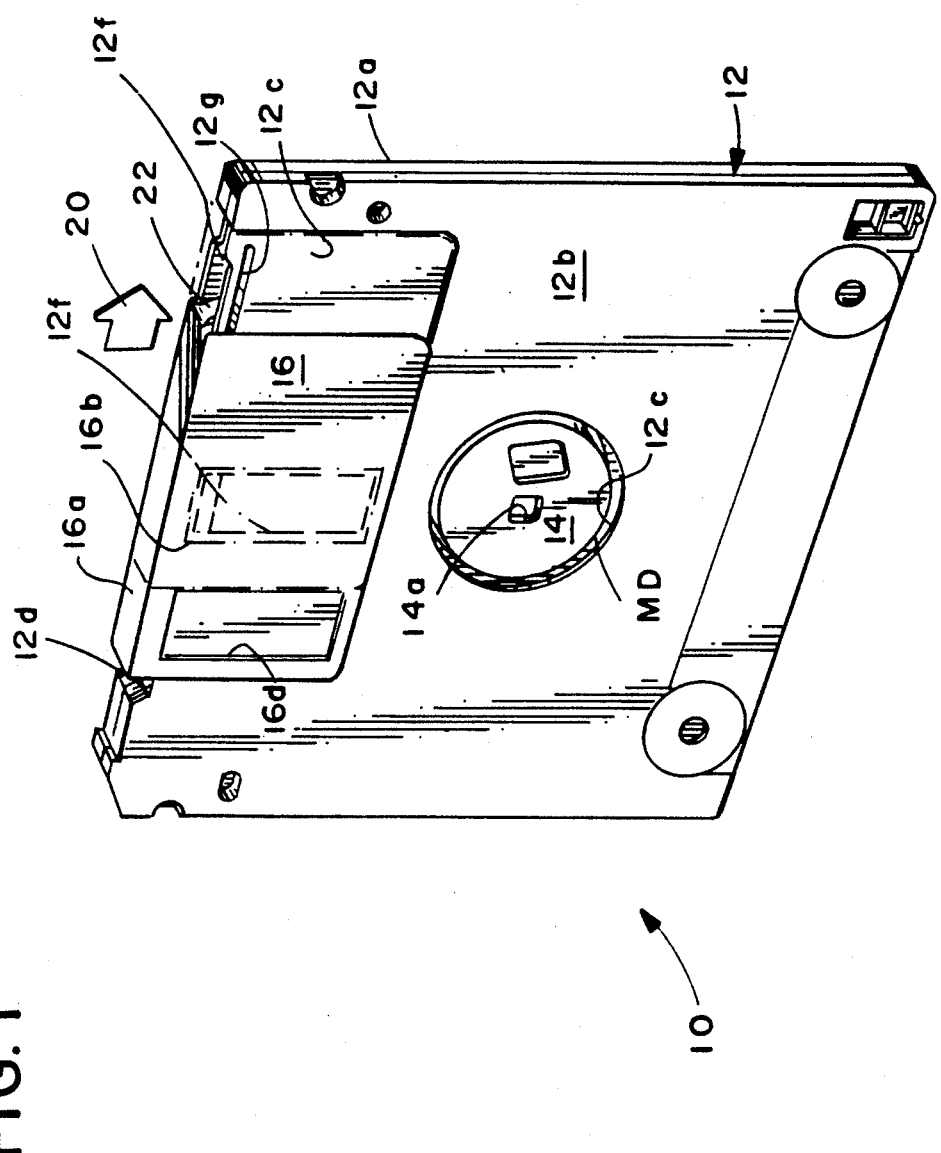
FIG. 1 is a perspective view of a flexible magnetic disc cassette that includes a movable shutter according to the present invention.

Accompanying FIG. 1 shows a preferred embodiment of a flexible magnetic disc cassette 10 according to the present invention. The cassette 10 shown in FIG. 1 is, moreover, configured according to accepted industry standards for nominal 3.5-inch discs. In this regard, the cassette 10 includes a cassette case 12 having upper and lower cassette case halves 12a, 12b, respectively, joined to one another along their peripheral edges, for example. The lower cassette case half 12b defines an enlarged opening 12c which accommodates a drive carriage (not shown) associated with a conventional magnetic recording/reproducing apparatus. The drive carriage will also include a centrally located spindle (not shown) which coacts with the drive aperture 14a associated with the central hub 14 of the magnetic disc MD.

The preferred cassette case 12 according to the present invention includes a movable shutter 16. In this regard, the shutter 16 is formed unitarily of a plastics material and is generally in the form of an inverted U-shape in cross-section. That is, shutter 16 includes a base 16a positioned adjacent the edge 12d of cassette case 12 which is nearest the access openings 18a, 18b. A pair of depending walls 16b, 16c unitarily joined along their upper edges to the base 16a therefore straddle the edge 12d of the cassette case 12. Most preferably, recessed surfaces are formed in the cassette case so as to accommodate the thickness of the shutter walls 16b, 16c to thereby establish an essentially smooth coplanar exterior surface for the cassette (see in this regard one such recessed surface 12d formed in the lower cassette case half 12b in FIG. 1).

The shutter walls 16b, 16c each define respective windows 16d, 16e which are moved into registry with openings 12e (only one such opening 12e being shown in FIG. 1) when the shutter is moved into its opened position (i.e., in the direction of arrow 20). Movement of the shutter 16 into its opened position typically happens automatically when the cassette 10 is inserted into the input slot of a magnetic recording/reproducing apparatus. The magnetic read/write head of such recording/reproducing apparatus may thus be brought into operative association with the magnetic disc MD by virtue of the registry of the shutter windows 16d, 16e and the cassette case openings 12d.

The shutter 16 is biased in a direction towards its closed position (i.e., in a direction opposite to arrow 20 via an integrally molded spring element 22). As is perhaps more clearly seen in accompanying FIGS. 2 and 3, the spring element 22 is integrally molded with the shutter 16 such that it is unitarily joined to the shutter base 16a at its end 22a. The spring element 22 extends longitudinally outwardly from the shutter base 22a and terminates in a free end 22b. A stress relief surface (preferably arcuate, and most preferably conforming to the generatrices of a right cylinder) is formed midway of the ends 22a and 22b so as to decrease the stiffness/increase the resilience at the joint 22d. Moreover, the stress relief surface 22c also establishes a pair of spring arms 22e, 22f.

Figure 2:
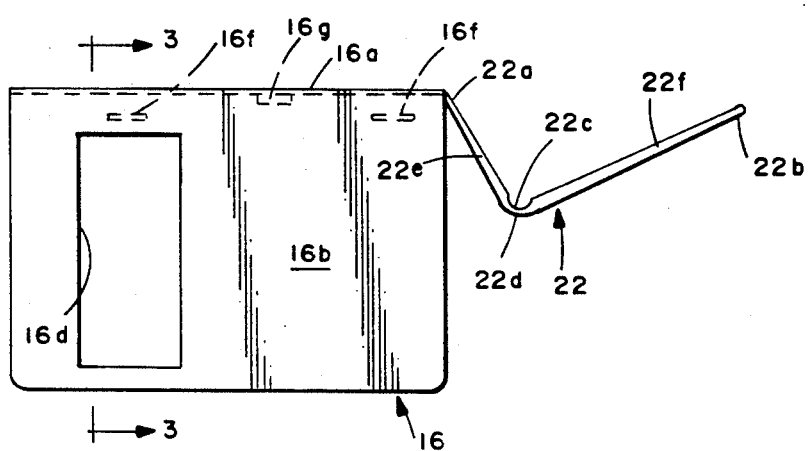
FIG. 2 is a side elevational view of one embodiment of a shutter according to the present invention particularly showing the integrally molded spring element thereof.
Figure 3:
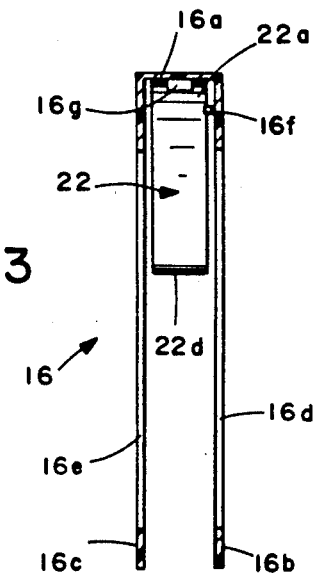
FIG. 3 is a latitudinal cross-section of the shutter shown in FIG. 2 as taken along line 3—3 therein.

It will also be observed in FIGS. 2 and 3 that the shutter 16 includes vertical and horizontal guide bosses 16f and 16g, respectively, which are preferably integrally molded with the shutter 16 and extend into the shutter's interior space. The vertical guide boss 16f is sized and configured so as to fit within the slot 12f formed in the top edge 12d of cassette 12 between the cassette halves 12a, 12b. The horizontal guide bosses 16g, on the other hand, are sized and configured so as to fit within the channel 12g extending parallel to the edge 12d and defined in the cassette half 12b. These guide bosses 16f and 16g serve to maintain the position of the shutter 16 during reciprocal movements between its closed and opened positions. In addition, the interaction between the horizontal boss 16g and the channel 12g prevent the shutter 16 from being easily removed from its operative position with the cassette case 12.

Figure 4A:
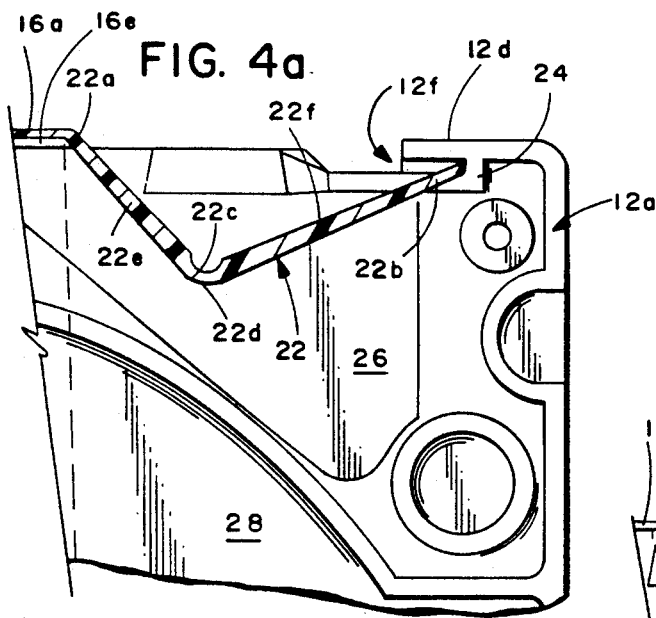
FIG. 4a is a partial longitudinal cross-section particularly showing the interaction between the integrally molded spring element of the shutter and the cassette case when the former is in its closed position.
Figure 4B:
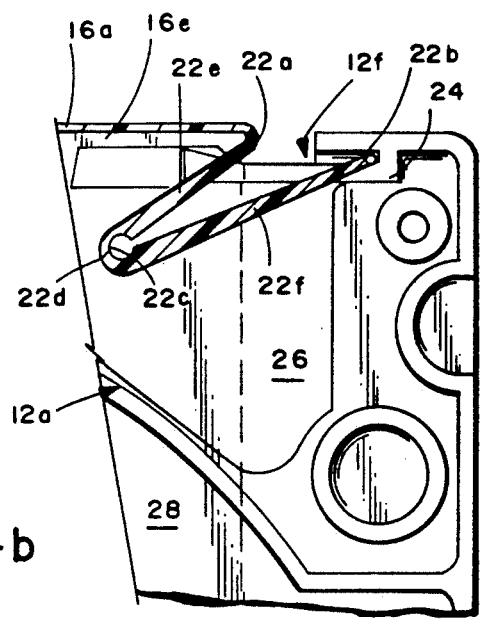
FIG. 4b is a partial longitudinal cross-section similar to FIG. 4a, but showing the shutter in its opened position.

Accompanying FIGS. 4a and 4b show the functional interaction between the integrally molded spring 22 and the upper cassette case half 12a when the shutter 16 is in its closed and opened positions, respectively. FIGS. 4a and 4b are shown with the cassette case half 12b being removed for clarity of presentation. It will be understood however that although FIGS. 4a and 4b are shown only in relation to the cassette half 12a, the other cassette half 12b is essentially a mirror image thereof. Thus, the cassette halves 12a, 12b serve to encase the integral spring element 22 when the cassette case 12 is fully assembled.

As is shown in FIGS. 4a and 4b, the free terminal end 22b of spring element 22 is received within a molded interior stop 24 which serves to positionally fix (immobilize) the end 22b of spring element 22 relative to the cassette case 12. The arms 22e, 22f of the spring element 22 will thus be positioned within an interior corner pocket 26 of the cassette case 12 defined by the opposing cassette case halves 12a, 12b. It will be appreciated that the pocket 26 in which the spring element 22 is positioned must be laterally disposed relative to the circular interior space 28 of cassette case 12 which is occupied by the magnetic disc MD. Since the cassette case 12 according to industry standards has a rectangular (square) geometry and the magnetic disc is circular, the pocket 26 most conveniently is formed in a corner of the cassette case 12 near the upper edge 12d.

In its closed position (as shown in FIG. 4a), the spring element will be substantially fully extended and thereby will be nearly in a completely relaxed state. However, complete relaxation of the spring element 22 should be avoided if possible since it is desirable to maintain a small but meaningful bias force against the shutter 16 to ensure that it positively seats in its closed position, and to ensure that the shutter 16 stays in its closed position during normal manipulation of the cassette 10.

Movement of the shutter 16 into its opened position (as shown in FIG. 4b) will cause the legs 22e, 22f to be displaced resiliently into a closer adjacent relationship with one another via a pivot action about joint 22d. Since the spring element 22 is integrally molded of the same resilient plastics material as the shutter 16, it will have a tendency to return to its "normal" position, which in this embodiment is the opened position of the shutter 16 as shown in FIG. 4a. Hence, movement of the shutter 16 into the closed position will be effected against the bias force of the spring element 22. That is, force of the spring element 22 will be essentially "loaded" when the shutter 16 is in its opened position, thereby causing the shutter to move back into its closed position when the shutter 16 is released.

Figure 5:
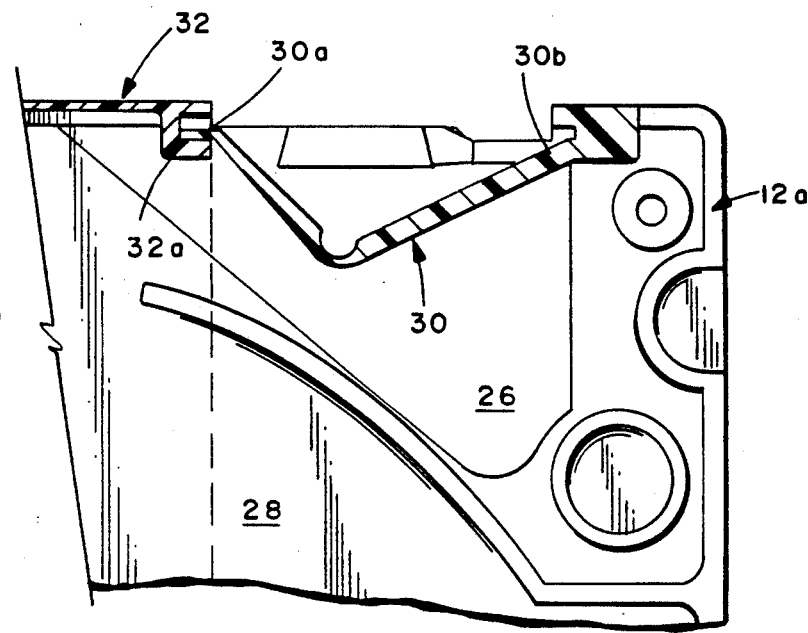
FIG. 5 is an alternative embodiment according to the present invention whereby the spring element is integrally molded with the magnetic cassette case and extends towards the shutter.

Accompanying FIG. 5 shows an alternative embodiment according to the present invention. In this regard, it will be observed that the spring element 30 in FIG. 5 is integrally molded (unitary) with the cassette case half 12a. Of course, the spring element 30 could likewise be integrally molded with the other cassette case half 12b, if desired. In the embodiment shown in FIG. 5, the shutter 32 is formed with a molded stop 32a which received the terminal free end 30a of spring element 30. The end 30b opposite to the free end 30a is therefore unitary with the cassette half 12a. Similar to the spring element 22 described previously, the spring element 30 according to this embodiment will likewise be formed with a stress relief surface 30c at joint 30d which establishes spring arms 30e, 30f. Movement of the shutter 32 from its closed position as shown in FIG. 5 towards its opened position will thereby be against the bias force of the spring element 30. Therefore, similar to the embodiment described previously, the shutter 32 will be biased into its closed position via the spring element 30 integrally molded with the cassette case half 12a.

Figure 6:
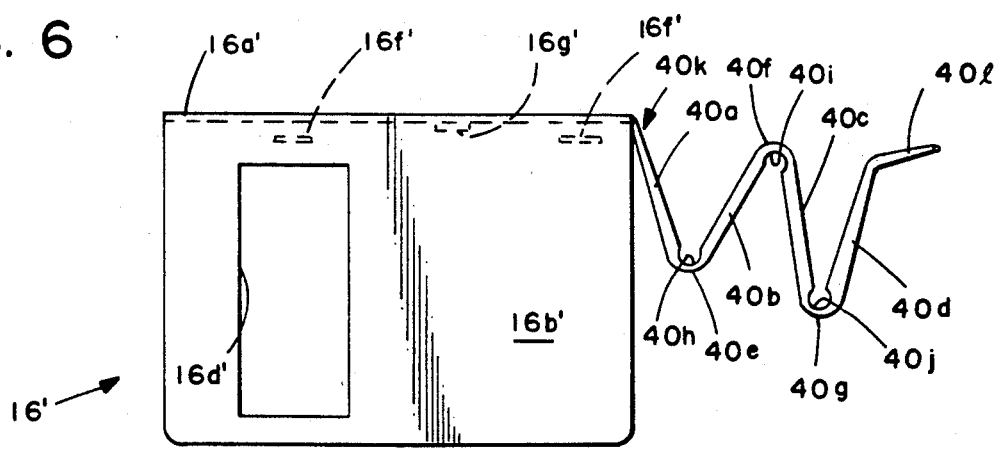
FIG. 6 is a side elevational view of another embodiment of the shutter with integrally molded spring element according to the present invention.
Figure 7A:
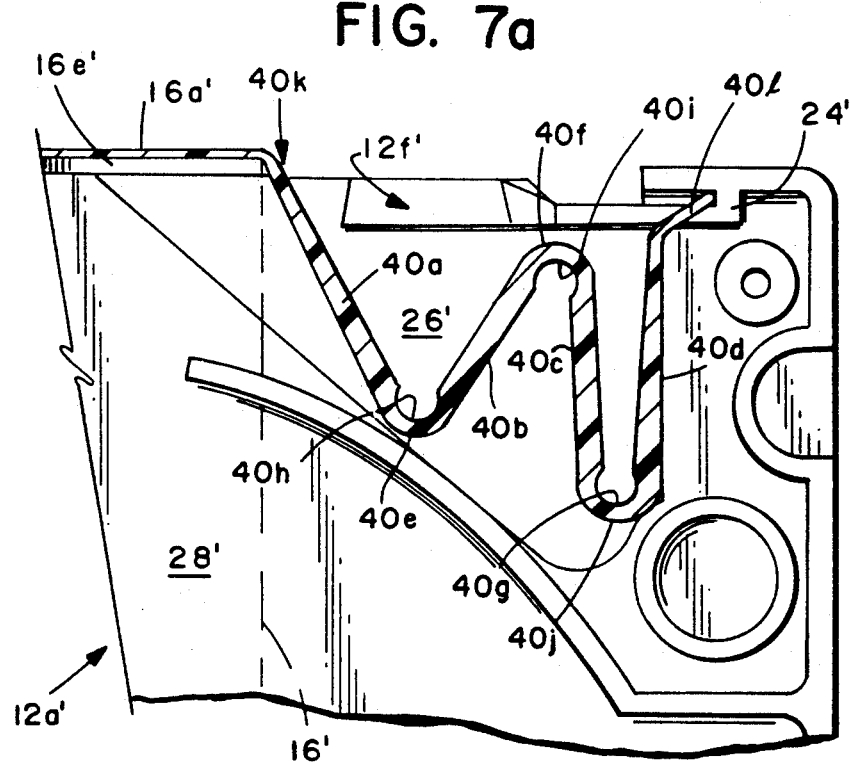
FIG. 7a is a partial longitudinal cross-section particularly showing the interaction between the integrally molded spring element of the shutter according to the embodiment depicted in FIG. 6 and the cassette case when the former is in its closed position.
Figure 7B:
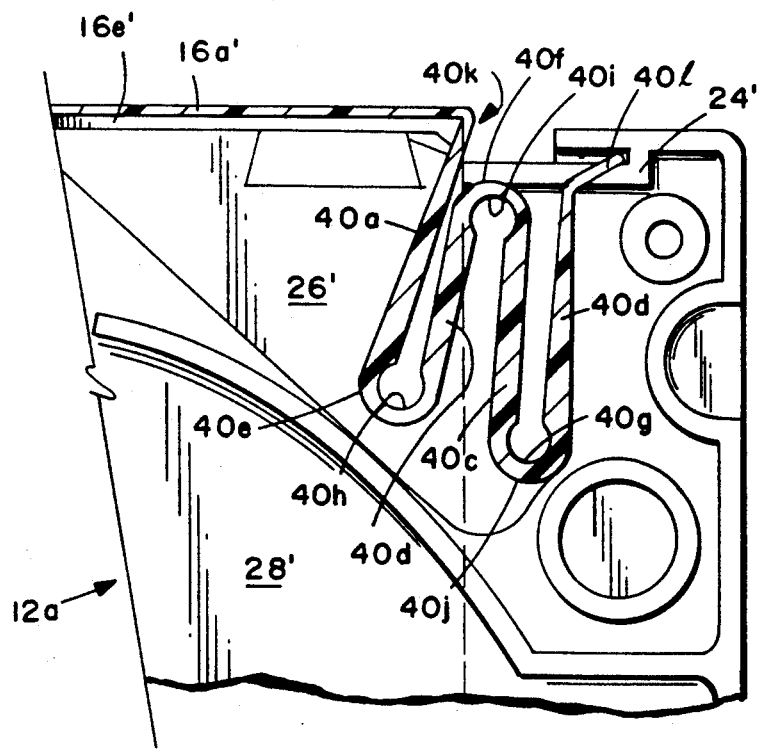
FIG. 7b is a partial longitudinal cross-section similar to FIG. 7a, but showing the shutter in its opened position.

Another embodiment of a shutter 16' according to this invention is shown in accompanying FIGS. 6 and 7a-7b. As is especially apparent in FIG. 6, the shutter 16' is quite similar to the shutter 16 described above with reference to FIGS. 2-3 and 4a-4b. Thus, like structures as between these embodiments will not again be described in detail here. However, like structures in the embodiment shown in FIGS. 6 and 7a-7b will be identified by the same reference numerals as used in FIGS. 2-3 and 4a-4b, but with a following prime (') designation.

As is seen particularly in FIG. 6, the shutter 16' includes an integrally molded (unitary) spring element 40 having multiple legs 40a-40d sequentially joined to one another via joints 22e-22g so that the legs 40a-d generally follow a serpentine configuration. Stress relief surface 22h-22j, like stress relief surface 22c described above, are provided so as to increase the resiliency (decrease stiffness) of the spring element 40 so that it exerts the desired bias force to the shutter 16'.

One end 40k of the spring element 40 is integrally molded with the shutter 16' at wall 16a', whereas the opposite free terminal end 40l of the spring element 40 is an angular extension of leg 40d and serves to mate with stop 24' integrally molded with cassette case half 12a' (and/or with the other cassette case half). The interaction between the terminal end 40l of spring element 40 and the stop 24' positionally fixes the end 40l and thereby provides ensures that the spring force inherent in the spring element 40 will be realized when the shutter 16' is moved from its closed position (as shown in FIG. 7a) into its opened position (as shown in FIG. 7b).

It will be observed in this regard, that in the closed position (FIG. 7a), the legs 40c and 40d are more closely adjacent one another as compared to legs 40a and 40b. Thus, the tendency of legs 40c and 40d to pivotally move away from one another imparts a slight (but desirable) bias force to the shutter 16' to positively maintain the same in its closed position. On the other hand, when the shutter 16' is in its opened position (FIG. 7b), the legs 40a and 40c are resiliently displaced closer to their corresponding legs 40b and 40d, respectively, with the greater resilient displacement occurring between legs 40a and 40b. Thus, when in its opened position, the spring element 40 is at or near its maximum bias force so that when the shutter 16' is released, positive sliding movement of the shutter 16' back into its closed position occurs.

A major portion of the resiliency of the spring elements discussed above is provided by means of the plastics material from which the shutter and spring are formed. In this regard, the preferred plastics material is an oxymethylene polymer having repeating oxymethylene ($-CH_2O-$) units. The oxymethylene polymers that may be satisfactorily employed according to the present invention can be either homopolymers (i.e., comprised solely of recurring oxymethylene units, exclusive of endcapping units), or copolymers (i.e., comprised mainly of recurring oxymethylene units randomly interspersed with higher oxyalkylene (preferably oxyethylene) units, exclusive of endcapping units). The preferred oxymethylene homopolymers may be made using the techniques disclosed in U.S. Pat. No. 2,768,994 to MacDonald, whereas the preferred oxymethylene copolymers may be made using the techniques disclosed in U.S. Pat. No. 3,027,352 to Walling (the entire content of each being expressly incorporated hereinto by reference).

Oxymethylene copolymers comprised mainly of recurring oxymethylene units interspersed with oxyethylene units are especially preferred. The most preferred oxymethylene copolymers are Celcon ® oxymethylene copolymers commercially available from Hoechst Celanese Corporation, Engineering Plastics Division, Short Hills, N.J. Most preferred is Celcon ® Grade MM3.5C polyoxymethylene copolymer.

If desired, the oxymethylene polymers may include additives typically employed in engineering resin compositions. Some of the additives that may be incorporated into oxymethylene polymers include antioxidants, UV stabilizers, free radical scavengers, lubricants, fillers, reinforcing media (e.g., glass fibers), colorants, and the like.

The preferred oxymethylene copolymer will possess a tensile strength (ASTM D638) at break of between 7600-8300 psi; an elongation (ASTM D638) at break of between 40-75%; a tensile yield strength (ASTM D638) of between 8800-10400 psi; a compressive strength (ASTM D695) of about 16000 psi @ 10%; a flexural strength (ASTM D790) of about 13000 psi; and a tensile modulus (ASTM D638) of between $410-464 \times 10^3$ psi.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A shutter to close an opening formed in a flexible magnetic disc cassette comprising:
   a shutter body formed of a molded plastics material, and having a generally inverted U-shaped cross-section; and
   an elongate spring element having one end which is integrally molded with said shutter body and thereby formed of said plastics material, said spring element having a terminal free end opposite said one end, wherein said spring element extends longitudinally outwardly from said shutter body between said one and terminal ends thereof, and wherein said spring element includes at least one joint having a stress relief surface which defines a region of reduced thickness of said spring element located between said one and another ends so as to thereby establish at least one pair of legs joined one to another end-to-end by said at least one joint, said stress relief surface of said joint providing a localized area of said spring element exhibiting decreased stiffness and increased resilience, thereby allowing relative pivotal movements of said at least one pair of legs to occur at said joint.

2. A magnetic disc cassette shutter as in claim 1, wherein said elongate spring element includes a plurality of leg pairs joined sequentially end-to-end to one another at a respective number of said joints so as to allow for resilient pivotal displacements thereabout.

3. A magnetic disc cassette shutter as in claim 1, wherein said stress relief surfaces are each arcuate.

4. A magnetic disc cassette shutter as in claim 3, wherein each said stress relief surface conforms to the generatrices of a right cylindrical surface.

5. A magnetic disc cassette shutter as in claim 1, wherein said shutter body and said spring element are integrally molded from an oxymethylene polymer.

6. A magnetic disc cassette shutter as in claim 5, wherein said oxymethylene polymer is an oxymethylene copolymer comprised mainly of repeating oxymethylene units randomly interspersed with higher oxyalkylene units.

7. A magnetic disc cassette shutter as in claim 6, wherein said higher oxyalkylene units are oxyethylene units.

8. A flexible magnetic disc cassette comprising:
a cassette case formed of a molded plastics material defining an interior space and an opening which opens into said interior space;
a flexible magnetic disc having a central hub rotatably accommodated with said interior space of said cassette case such that said magnetic disc is exposed beneath said opening of said cassette case; and
a shutter formed of a plastics material which may be the same or different from the plastics material from which said cassette case is formed, said shutter straddling an edge of said cassette case adjacent to said defined opening and being reciprocally movable between a closed position wherein said shutter covers said opening thereby closing the same, and an opened position wherein said shutter exposes said opening to allow access to said magnetic disc therebeneath, and
an elongate spring element positioned within a corner pocket of said cassette case and exerting a bias force against said shutter in a direction which encourages said shutter to move into said closed position, wherein said elongate spring is integrally molded at one end thereof to one of said shutter and said cassette case, and wherein said spring element includes at least one joint having a stress relief surface which defines a region of reduced thickness of said spring element located between said one end and another end thereof so as to thereby establish at least one pair of legs joined one to another end-to-end by said at least one joint, said stress relief surface of said joint providing a localized area of said spring element exhibiting decreased stiffness and increased resilience, thereby allowing relative pivotal movements of said at least one pair of legs to occur at said joint.

9. A magnetic disc cassette as in claim 8, wherein said spring element is integrally molded with said cassette case.

10. A magnetic disc cassette as in claim 8, wherein said spring element is integrally molded with said shutter.

11. A magnetic disc cassette as in claim 10, wherein said shutter and spring element are integrally molded from an oxymethylene polymer.

12. A magnetic disc cassette as in claim 11, wherein said oxymethylene polymer is an oxymethylene copolymer comprised mainly of repeating oxymethylene units randomly interspersed with higher oxyalkylene units.

13. A magnetic disc cassette as in claim 12, wherein said higher oxyalkylene units are oxyethylene units.

14. A magnetic disc cassette as in claim 8, wherein said elongate spring element includes a plurality of leg pairs joined sequentially end-to-end to one another at a respective number of said joints so as to allow for resilient pivotal displacements thereabout.

15. A magnetic disc cassette as in claim 14, wherein said one end of said spring element is integrally molded to said shutter, and said another end thereof is an opposite free terminal end, and wherein said cassette case includes a stop disposed within said corner pocket for positionally fixing said terminal end of said spring element relative to said cassette case.

16. A magnetic disc cassette as in claim 14, wherein said stress relief surfaces are each arcuate.

17. A magnetic disc cassette as in claim 16, wherein each said stress relief surface conforms to the generatrices of a right cylindrical surface.

* * * * *

UNITED STATES PATENT AND TRADEMARK OFFICE
CERTIFICATE OF CORRECTION

PATENT NO. : 5,164,871

DATED : November 17, 1992

INVENTOR(S) : HUGHES et al

It is certified that error appears in the above-identified patent and that said Letters Patent is hereby corrected as shown below:

item [57] Title page,
Under Abstract, line 5, after "modated" delete "with" and insert --within--;
line 9, after "material" delete "form" and insert --from-- and after "which" delete "said" and insert --the--;
line 13, before "shutter" delete "said" and insert --the--;
line 18, after "shutter" delete "and".

Column 3, line 37, delete "18a, 18b" and insert --12e--;
line 45, after "surface" delete "12d" and insert --12c--;
line 59, after "openings" delete "12d" and insert --12e--.

Column 5, line 16, delete "received" and insert --receives--;
line 57, after "thereby" delete "provides".

IN THE DRAWINGS:

FIG. 1, change the first occurrence of "12f" to --12e--.

Signed and Sealed this

Thirtieth Day of November, 1993

Attest:

BRUCE LEHMAN

Attesting Officer

Commissioner of Patents and Trademarks